United States Patent
Niekerk et al.

(10) Patent No.: US 10,946,485 B2
(45) Date of Patent: Mar. 16, 2021

(54) METHOD FOR WELDING TWO COMPONENTS

(71) Applicant: Bayerische Motoren Werke Aktiengesellschaft, Munich (DE)

(72) Inventors: Johann Van Niekerk, Munich (DE); Maik Hammer, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 15/992,407

(22) Filed: May 30, 2018

(65) Prior Publication Data
US 2018/0272475 A1   Sep. 27, 2018

Related U.S. Application Data

(63) Continuation of application No. PCT/EP2017/051127, filed on Jan. 19, 2017.

(30) Foreign Application Priority Data

Jan. 29, 2016   (DE) .................... 10 2016 201 321.1

(51) Int. Cl.
*B23K 26/22*   (2006.01)
*B23K 33/00*   (2006.01)
(Continued)

(52) U.S. Cl.
CPC ........ *B23K 33/008* (2013.01); *B23K 26/0622* (2015.10); *B23K 26/22* (2013.01);
(Continued)

(58) Field of Classification Search
CPC .............. B23K 26/0622; B23K 26/22; B23K 2101/185; B23K 2103/10; B23K 2103/20; B23K 2103/04; B23K 33/008
See application file for complete search history.

(56) References Cited

U.S. PATENT DOCUMENTS

| 2002/0043521 A1* | 4/2002 | Klein | ................... B60N 2/682 |
|---|---|---|---|
| | | | 219/121.64 |
| 2005/0269299 A1* | 12/2005 | Rittner | ................... H01J 9/28 |
| | | | 219/121.64 |

(Continued)

FOREIGN PATENT DOCUMENTS

| CN | 1341048 A | 3/2002 |
|---|---|---|
| CN | 1706584 A | 12/2005 |

(Continued)

OTHER PUBLICATIONS

Chinese-language Office Action issued in counterpart Chinese Application No. 201780003626.X dated Mar. 28, 2019 with English translation (14 pages).

(Continued)

*Primary Examiner* — Brian W Jennison
(74) *Attorney, Agent, or Firm* — Crowell & Moring LLP

(57) ABSTRACT

A method for welding two components is provided. The method includes providing a first component, which has a convex elevation, and providing a second component, which has a through-hole. The method also includes placing the two components one against the other such that the convex elevation of the first component protrudes into the through-hole in an interlocking manner, and welding the two components along the rim of the through-hole by way of a laser welding device. The welding is performed without the use of a welding filler and the laser welding device is repeatedly switched on and off in a pulsed manner during the welding of the two components along the rim of the through-hole.

18 Claims, 1 Drawing Sheet

(51) Int. Cl.
*B23K 26/0622* (2014.01)
*B23K 101/18* (2006.01)
*B23K 103/04* (2006.01)
*B23K 103/10* (2006.01)
*B23K 103/20* (2006.01)

(52) U.S. Cl.
CPC .... *B23K 2101/185* (2018.08); *B23K 2103/04* (2018.08); *B23K 2103/10* (2018.08); *B23K 2103/20* (2018.08)

(56) References Cited

U.S. PATENT DOCUMENTS

| | | | | |
|---|---|---|---|---|
| 2006/0213954 | A1* | 9/2006 | Ruther | B23K 20/2333 228/113 |
| 2009/0294410 | A1* | 12/2009 | Iwase | B21J 15/08 219/91.23 |

FOREIGN PATENT DOCUMENTS

| | | |
|---|---|---|
| CN | 101056737 A | 10/2007 |
| CN | 101888149 A | 11/2010 |
| CN | 102834219 A | 12/2012 |
| CN | 102834626 A | 12/2012 |
| CN | 202651239 U | 1/2013 |
| CN | 103124670 A | 5/2013 |
| DE | 199 61 696 C1 | 4/2001 |
| DE | 10 2004 027 806 A1 | 1/2006 |
| EP | 2154054 A1 | 2/2010 |
| WO | WO 01/45894 A1 | 6/2001 |
| WO | WO 2006/051022 A1 | 5/2006 |
| WO | WO 2011/134563 A1 | 11/2011 |
| WO | WO 2011/134564 A1 | 11/2011 |
| WO | WO 2012/038012 A2 | 3/2012 |

OTHER PUBLICATIONS

Chinese-language Office Action issued in counterpart Chinese Application No. 201780003626.X dated Nov. 19, 2019 with English translation (15 pages).
German-language Office Action issued in counterpart German Application No. 10 2016 201 321.1 dated Jul. 28, 2016 with partial English-language translation (Nine (9) pages).
International Search Report (PCT/ISA/210) issued in PCT Application No. PCT/EP2017/051127 dated Apr. 24, 2017 with English-language translation (Five (5) pages).
Japanese-language Written Opinion (PCT/ISA/237) issued in PCT Application No. PCT/EP2017/051127 dated Apr. 24, 2017 (Four (4) pages).
Chinese Office Action issued in Chinese application No. 201780003626.X dated Nov. 20, 2020, with English translation (Eighteen (18) pages).

* cited by examiner

METHOD FOR WELDING TWO COMPONENTS

CROSS REFERENCE TO RELATED APPLICATIONS

This application is a continuation of PCT International Application No. PCT/EP2017/051127, filed Jan. 19, 2017, which claims priority under 35 U.S.C. § 119 from German Patent Application No. 10 2016 201 321.1, filed Jan. 29, 2016, the entire disclosures of which are herein expressly incorporated by reference.

BACKGROUND AND SUMMARY OF THE INVENTION

The present invention relates to a method for welding two components.

It is an object of the invention to specify a method with which two components which are positioned precisely relative to each other can be welded to each other in a high-quality manner, with the welding method being suitable for large-series applications.

This and other objects are achieved by a method for welding two component in accordance with embodiments of the invention.

The starting point according to an embodiment of the invention is a method for welding two components, wherein first of all a first component is provided, which has a convex elevation. The convex elevation can be formed, for example, by a bulge. The bulge can have, for example, the shape of a spherical dome.

Furthermore, a second component is provided, which has a through-hole. The convex elevation and the through-hole are coordinated with each other in such a manner that the two components can be placed onto each other such that the convex elevation of the first component protrudes into the through-hole of the second component in an interlocking manner. As a result, the two components can be exactly positioned relative to each other.

The through-hole can be a circular through-hole. As an alternative thereto, the through-hole can also be designed as an elongated hole.

The components are subsequently welded to each other along the edge of the through-hole, specifically by way of a laser welding device. As a result, contactless welding of the two components is possible, with welding being possible even in unfavorable installation situations, e.g., if little installation space is available.

The welding of the two components is performed, according to an embodiment of the invention, without the use of a welding filler material.

An essential concept of the invention furthermore consists in that the welding is performed by a pulsed laser beam. The laser beam is therefore repeatedly switched on and off. By way of such a pulsed laser beam, the admission of heat can be minimized, as a result of which the risk of the production of pores or holes is minimized. Overall, a welding connection of very high quality can thereby be produced between the two components. The method according to the invention is therefore suitable in particular for welding relatively thin sheet, as are used, for example, in vehicle body manufacturing. Accordingly, the first and/or the second component can be, for example, a steel or aluminum sheet. In particular in vehicle body manufacturing, the welding of sheets with a pulsed laser beam is a novel method.

By way of the pulsed welding of the two components, the components are fixed relative to each other.

The two components can subsequently be spot-welded to each other at further points and/or can be welded via a weld seam, as a result of which the two components are then "fixedly" connected to each other. Since the two components are fixed relative to each other, during the "fixed welding" of the two components, the operation can be carried out with a higher admission of heat since, owing to the fixing, there is no longer the risk of component distortion or slipping of the components.

It is therefore possible for the two components to be connected to each other at a plurality of such "connecting points", in particular by way of welding connections. In this context (as described above), "connecting points" are understood as meaning a convex elevation or bulge which is provided in one of the two components and protrudes into a through-hole which is provided in the other of the two components and can be designed as a circular hole or as an elongated hole.

A plurality of welding points which are spaced apart from one another can be produced along the through-hole by way of the laser welding device. As an alternative thereto, a closed weld seam can also be produced along the through-hole by way of the pulsed laser beam, which is produced by the laser welding device, i.e., the two components can be welded to each other along the entire edge of the through-hole.

The invention can be used in particular in vehicle body manufacturing. Accordingly, the first component and the second component can each be sheet metal components. For example, the first or second component can be a steel or aluminum sheet metal component, in particular a steel or aluminum sheet metal component for a vehicle body to be produced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
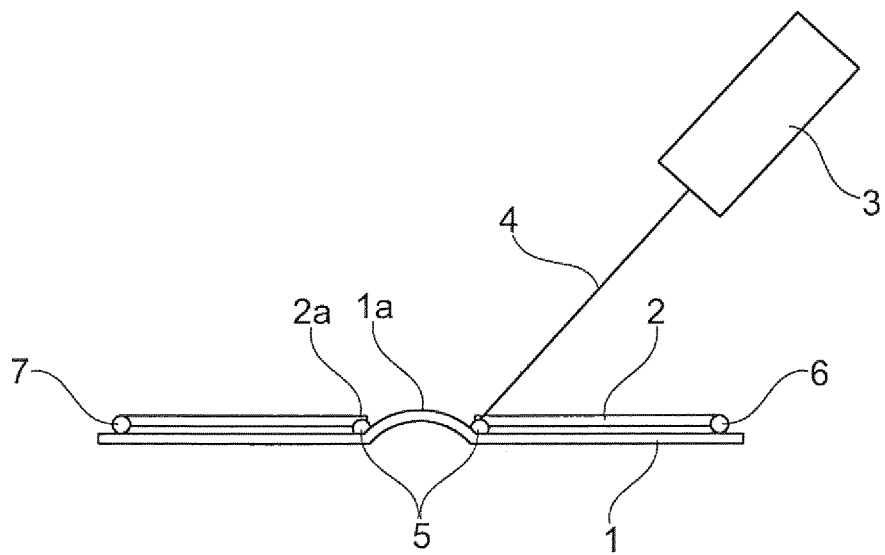
FIG. 1 is a schematic view illustrating welding two components according to an embodiment of the invention.

FIG. 1 shows a first sheet metal component 1 which has an elevation 1a which is convex or is in the form of a spherical dome. A second sheet metal component 2 which has a through-hole 2a is mounted onto the first sheet metal component 1. The convex elevation 1a and the through-hole 2a are dimensioned in such a manner that the convex elevation 1a engages in the through-hole 2a in an interlocking manner.

A pulsed laser beam 4 is produced by way of a laser welding device 3 which is arranged spaced apart from the two sheet metal components 1, 2. The two sheet metal components 1, 2 are welded to each other along the edge of the through-hole 2a by way of the pulsed laser beam 4. A plurality of welding points which are spaced apart from one another or an encircling weld seam 5 can be produced along the edge of the through-hole 2a by way of the laser welding device. As a result, the two sheet metal components 1, 2 are connected to each other in an integrally bonded manner.

The welding is preferably performed without the use of welding filler material. In addition to the welding along the edge of the through-hole 2*a*, the two sheet metal components 1, 2 are connected to each other in the edge region of the sheet metal component 2 via welding points 6, 7.

Figure 2:
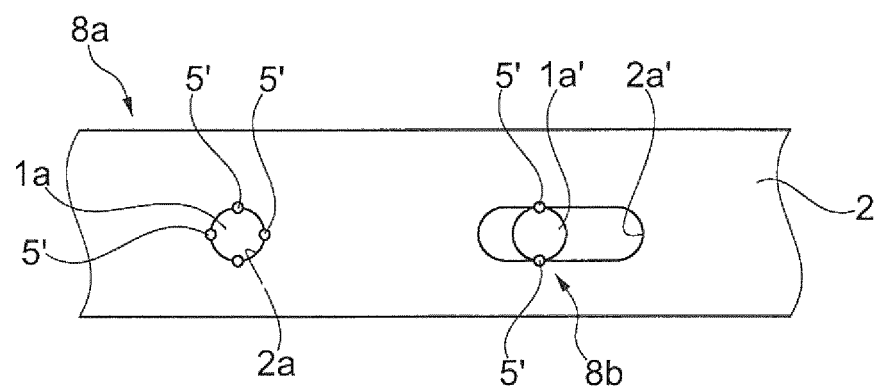
FIG. 2 is a view of an exemplary embodiment illustrating welding two sheet metal components.

FIG. 2 shows an exemplary embodiment in which two sheet metal components are welded to each other at two connecting points 8*a*, 8*b*. The connecting point 8*a* is formed correspondingly to FIG. 1. In the case of the further connecting point 8*b*, the through-hole is designed as an elongated hole 2*a*', into which a further elevation 1*a*' protrudes in an interlocking manner. At the two connecting points, the two sheet metal components are welded to each other by welding points 5' which are provided along the edge of the through-holes. Instead of via welding points, the two sheet metal components could also be welded to each other at the through-holes by way of weld seams.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for welding two components, the method comprising the acts of:
    providing a first component, which has a convex elevation;
    providing a second component, which has a through-hole;
    placing the first and second components on each other such that the convex elevation of the first component protrudes into the through-hole in an interlocking manner;
    in a first welding act, welding the first and second components along an edge of the through-hole by a pulsed laser beam and fixing the first and second components relative to each other by the first welding act, wherein the welding is performed without use of a welding filler material; and
    in a second welding act subsequent to the first welding act, fixedly connecting the first and second components to each other by the second welding act, wherein the second welding act comprises spot-welding the first and second components to each other at a plurality of locations spaced apart from the through-hole and/or welding the first and second components to each other via a weld seam at a location spaced apart from the through-hole and wherein a higher admission of heat is used in the second welding act than in the first welding act.

2. The method according to claim 1, wherein the first welding act further comprises the act of:
    producing a plurality of welding points which are spaced apart from one another along the through-hole.

3. The method according to claim 1, wherein the first welding act further comprises the act of:
    producing a closed weld seam along the through-hole.

4. The method according to claim 2, wherein the first welding act further comprises the act of:
    producing a closed weld seam along the through-hole.

5. The method according to claim 1, wherein the first component and/or the second component are/is a sheet metal component.

6. The method according to claim 1, wherein the first component and/or the second component are/is a steel or aluminum sheet metal component.

7. The method according to claim 1, wherein the first component and/or the second component are/is a vehicle body component.

8. The method according to claim 5, wherein the first component and/or the second component are/is a vehicle body component.

9. The method according to claim 6, wherein the first component and/or the second component are/is a vehicle body component.

10. The method according to claim 1, wherein the first welding act further comprises the acts of:
    welding the first and second components to each other at a plurality of connecting points; and
    forming each of the plurality of connecting points by an elevation or bulge which is provided in one of the first and second components and protrudes into a second through-hole provided in the other of the first and second components.

11. The method according to claim 10, wherein the elevation or bulge protrudes into the second-through hole in an interlocking manner.

12. The method according to claim 9, wherein the first welding act further comprises the acts of:
    welding the first and second components to each other at a plurality of connecting points; and
    forming each of the plurality of connecting points by an elevation or bulge which is provided in one of the first and second components and protrudes into a second through-hole provided in the other of the first and second components.

13. The method according to claim 12, wherein the elevation or bulge protrudes into the second-through hole in an interlocking manner.

14. The method according to claim 1, wherein the through-hole is a circular hole or an elongated hole.

15. The method according to claim 2, wherein the through-hole is a circular hole or an elongated hole.

16. The method according to claim 4, wherein the through-hole is a circular hole or an elongated hole.

17. The method according to claim 12, wherein the second-through hole is a circular hole or an elongated hole.

18. The method according to claim 13, wherein the second-through hole is a circular hole or an elongated hole.

* * * * *